United States Patent
Gnanasambandam et al.

(10) Patent No.: US 8,181,217 B2
(45) Date of Patent: May 15, 2012

(54) MONITORING PRESENTATION TIMESTAMPS

(75) Inventors: Senthil Kumar Gnanasambandam, Sunnyvale, CA (US); Sanath K Yekollu, Santa Clara, CA (US); Pradip K Fatehpuria, San Jose, CA (US)

(73) Assignee: Microsoft Corporation, Redmond, WA (US)

( * ) Notice: Subject to any disclaimer, the term of this patent is extended or adjusted under 35 U.S.C. 154(b) by 619 days.

(21) Appl. No.: 11/964,737

(22) Filed: Dec. 27, 2007

(65) Prior Publication Data

US 2009/0172457 A1 Jul. 2, 2009

(51) Int. Cl.
*H04N 7/173* (2011.01)
(52) U.S. Cl. ............ 725/131; 725/32; 725/34; 725/135; 725/136
(58) Field of Classification Search .................. 725/131, 725/135, 136, 32, 34
See application file for complete search history.

(56) References Cited

U.S. PATENT DOCUMENTS

| | | | |
|---|---|---|---|
| 4,547,804 A | 10/1985 | Greenberg | |
| 4,967,273 A | 10/1990 | Greenberg | |
| 5,065,345 A | 11/1991 | Knowles et al. | |
| 5,126,990 A | 6/1992 | Efron et al. | |
| 5,898,695 A * | 4/1999 | Fujii et al. | 370/464 |
| 7,072,908 B2 | 7/2006 | Dideriksen et al. | |
| 7,089,319 B2 | 8/2006 | Lysenko et al. | |
| 2004/0055013 A1 * | 3/2004 | Ishioka et al. | 725/89 |
| 2004/0078575 A1 | 4/2004 | Morten et al. | |
| 2004/0240390 A1 | 12/2004 | Seckin | |
| 2004/0244057 A1 * | 12/2004 | Wallace et al. | 725/135 |
| 2004/0261124 A1 * | 12/2004 | Nakashima et al. | 725/131 |
| 2005/0024487 A1 | 2/2005 | Chen | |

OTHER PUBLICATIONS

Strachan, "Continuity Monitoring of Audio, Video and Data in a Multi-Channel Facility", Evertz Microsystems Ltd., pp. 1-7.
DTS8888, "Visual DV Time Stamp 2.0.0" 1997-2007, FileDudes.com, pp. 1-2.
"Testing MPEG based IP video QoE/QoS", Shenick Network Systems, pp. 1-17.

* cited by examiner

*Primary Examiner* — Joseph P Hirl
*Assistant Examiner* — Jivka Rabovianski

(57) ABSTRACT

Techniques to monitor presentation timestamps for content are described, which may be used to render content at a client. In an implementation, content is received having timestamps that define expected timing for output of the content at a client. The timestamps may then be monitored and compared to a client clock to determine if the content rendered matches the content expected to be rendered. When a discrepancy is detected, one or more corrective actions may be undertaken to restore output of the content to the timing defined by the timestamps.

20 Claims, 4 Drawing Sheets

MONITORING PRESENTATION TIMESTAMPS

BACKGROUND

A network operator may provide a wide variety of content to clients. For example, the network operator may be configured as a head end to provide television content, video-on-demand, music and so on to clients, such as televisions, digital video recorders and set-top boxes. The network operator typically obtains this content from content providers for streaming to the clients, such as households, businesses and so on. To provide this content, the network operator configures the content into a form that is suitable for use by the households. For example, the network operator may change a format of the content, map the content to particular channels, and so on such that the content is in a form that is suitable for consumption by the clients.

To perform this configuration and then distribute the content over a network, the network operator may employ a variety of devices, such as integrated receivers/decoders, encoders, servers, and so on. However, these devices may be provided through use of a distributed system. Therefore, the distribution of content between the devices and to clients may introduce data impairment. Consequently, the data impairment may lead to errors by the client when consuming the content, such as improper playback including missed frames, repeated frames, and so on. For instance, data impairment may result in "bad data" which may cause a client or a renderer of the client to stop processing data properly (e.g., "hang up"). Thus, the clients may output the content in a manner that does not follow the expected content-viewing experience.

SUMMARY

Techniques to monitor presentation timestamps for content are described, which may be used to render content at a client. In an implementation, content is received having timestamps that define expected timing for output of the content at a client. The timestamps may then be monitored and compared to a client clock to determine if the content rendered matches the content expected to be rendered. When a discrepancy is detected, one or more corrective actions may be undertaken to restore output of the content to the timing defined by the timestamps.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Overview

Network operators typically obtain content from content providers to be streamed to clients, such as households, businesses, educational institutions, and so on. The network operator, however, may employ a variety of devices to provide this content which may be implemented as a distributed system. Because the system is distributed, however, communication of content between devices and over a network may cause "bad data" to be introduced, which may cause inaccurate presentation of content at a client. For instance, "bad data" may cause a content renderer to stop processing data properly, e.g., "hang up."

Techniques to monitor presentation timestamps for output of content at a client are described. In an implementation, timestamps may be associated with content available from a network operator to clients over a network. Timestamps may also be associated with contain available locally, such as from a DVD or other computer-readable media. The timestamps may define timing for output of the content. For example, the timestamps may be used to define a presentation clock for the content which is indicative of expected timing of portions of content relative to one another.

When content is output at a client, a client clock local to the client may be initialized and executed to monitor the timing of the output content. For instance, the timestamps may be monitored and compared relative to the client clock to determine if the content rendered at a given time matches the content expected to be rendered based on the timestamps. When a discrepancy is detected between the client clock and the timing defined by the timestamps, one or more corrective actions may be undertaken. For instance, the client or a renderer of the client may be reset, "bad data" may be deleted or ignored, a next expected portion of content may be obtained and output based on the timestamps, and so forth. In this manner, output of the content may be restored to the timing that is defined by the timestamps.

In the following discussion, an exemplary environment is first described that is operable to perform techniques to monitor presentation timestamps. Exemplary procedures are then described that may be employed in the exemplary environment, as well as in other environments. Although monitoring presentation timestamps is described in a television environment in the following discussion, it should be readily apparent that these techniques may be employed in a wide variety of environments without departing from the spirit and scope thereof.

Exemplary Environment

Figure 1:
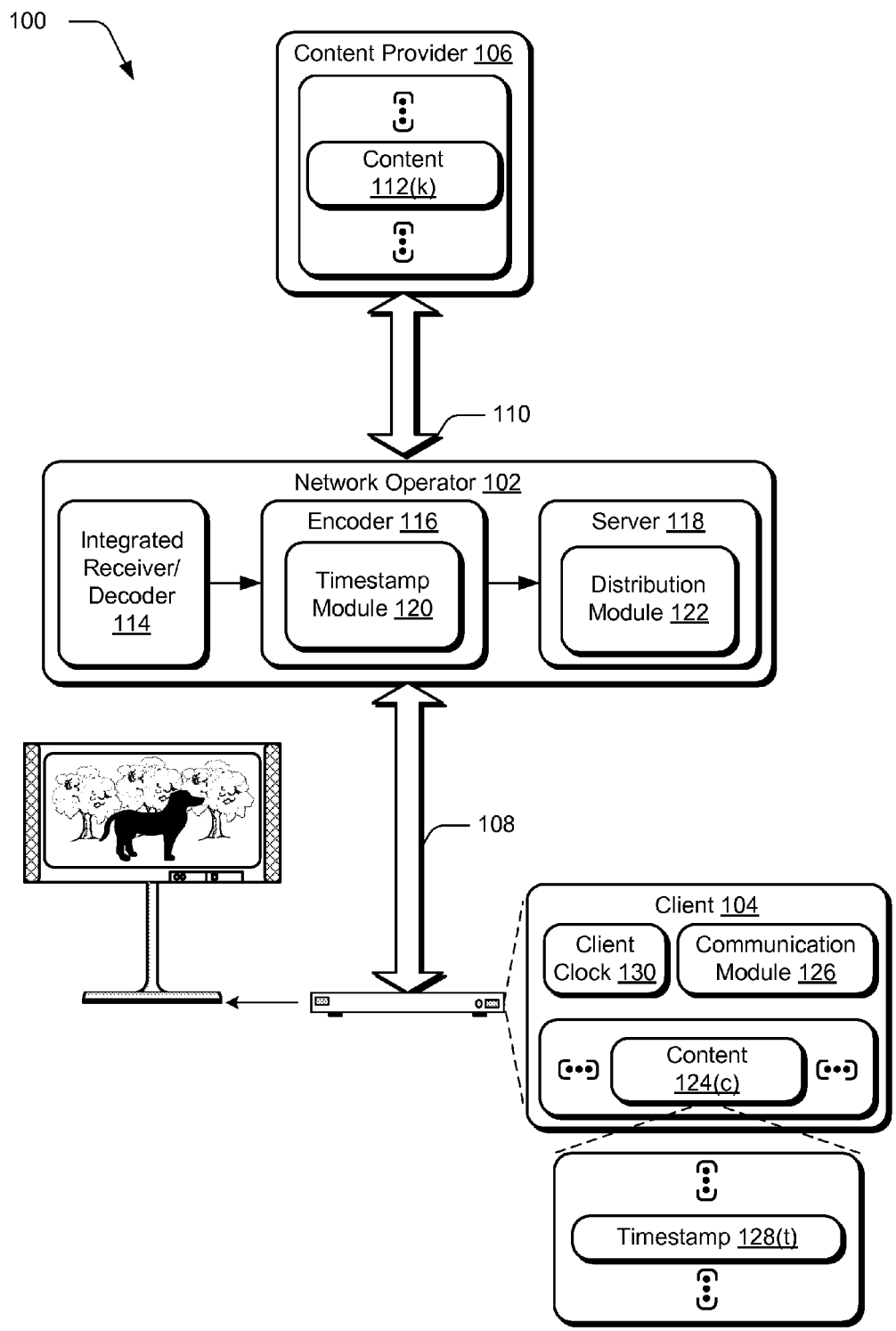
FIG. 1 is an illustration of an environment in an exemplary implementation that is operable to employ techniques to monitor presentation timestamps.

FIG. 1 is an illustration of an environment 100 in an exemplary implementation that is operable to employ techniques to monitor presentation timestamps at a client. The illustrated environment 100 includes a network operator 102 (e.g., a "head end"), a client 104, and a content provider 106 that are communicatively coupled via network connections 108, 110. In the following discussion, the network operator 102, the client 104 and the content provider 106 may be representative of one or more entities, and therefore reference may be made to a single entity (e.g., the client 104) or multiple entities (e.g., the clients 104, the plurality of clients 104, and so on). The client 104, in portions of the following discussion, may also relate to a person and/or entity that operate a device. In other words, the client 104 may describe a logical client that includes software and/or devices. Additionally, although a plurality of network connections 108-110 are shown separately, the network connections 108-110 may be representative of network connections achieved using a single network or multiple networks.

The client 104 may be configured in a variety of ways. For example, the client 104 may be configured as a computer that is capable of communicating over the network connection 108, such as a desktop computer, a mobile station, an entertainment appliance, a set-top box communicatively coupled to a display device as illustrated, a wireless phone, and so forth.

The content provider 106 includes one or more items of content 112(k), where "k" can be any integer from 1 to "K". The content 112(k) may include a variety of data, such as television programming, video-on-demand, recorded video, music, web pages, and so forth. The content 112(k) is communicated over the network connection 110 to the network operator 102, such as through a broadcast.

Content 112(k) communicated via the network connection 110 is received by the network operator 102 and configured for distribution to the client 104 over the network connection 108. Distribution from the network operator 102 to the client 104 may be accommodated in a number of ways, such as through a broadcast including cable, radio frequency (RF), microwave, digital subscriber line (DSL), and satellite.

As previously described, the network operator 102 may employ a variety of devices which may be implemented via a distributed system, examples of which are illustrated as an integrated receiver/decoder 114, an encoder 116 and a server 118 (e.g., distribution server) as shown in FIG. 1.

Integrated receiver/decoder 114 represents functionality to receive content 112(k) from content sources, such as the content provider 106 of FIG. 1. When content 112(k) is received in encrypted form, integrated receiver/decoder 114 may further represent functionality to decode the content 112(k) for processing by the network operator 102.

The encoder 116 is representative of functionality of the network operator 102 to utilize one or more techniques to ready the content 112(k) for distribution to the client 104. The encoder 116, for instance, may operate to provide video and audio encoding of content 112(k) from content providers 106. Encoding by the encoder 116 may include compression, translation, time encoding, analog/digital conversion, and encryption techniques performed on the content 112(k).

In an implementation, network operator 102 includes a timestamp module 120 that may be employed to associate timing data with content 112(k). As illustrated in FIG. 1, timestamp module 120 may be implemented as a component of the encoder 116. Thus, encoder 116 may further represent functionality to encode timing data in the content 112(k), which may then be monitored by a client 104 to output content 112(k) according the techniques described herein. The encoder 116 may then communicate the content 112(k) to the server 118 for further processing in a variety of ways, such as through use of a Motion Picture Experts Group (MPEG) Transport Stream (TS). A variety of other examples are also contemplated.

Server 118 is illustrated as having distribution module 122 that may represent functionality of the network operator 102 to configure content 112(k) for output (e.g., streaming) over the network connection 108 to the client 104. The distribution module 122, for instance, may configure content 112(k) received from the content provider 106 to be suitable for transmission over the network connection 108, such as to "packetize" the content for distribution over the Internet, configuration for a particular broadcast channel, map the content 112(k) to particular channels, and so on. The distribution module 122, for instance, may further encrypt "packetized" content 112(k) for communication over an IP network (e.g., network connection 108) to client 104. The encryption performed by the distribution module 122 is selected such that the client 104 may decrypt the content 112(k) for rendering.

Thus, in the environment 100 of FIG. 1, the content provider 106 may broadcast the content 112(k) over a network connection 110 to a multiplicity of network operators, an example of which is illustrated as network operator 102. The network operator 102 may then stream the content 112(k) over a network connection 108 to a multitude of clients, an example of which is illustrated as client 104. The client 104 is depicted as having received content 124(c) (where "c" can be any integer from one to "C"), which may be inclusive of content 112(k) that is communicated from the network operator 102 over the network connection 108. The client 104 may then output the content 124(c) immediately (e.g., "streaming" playback) and/or store the content in a storage device, such as when the client 104 is configured to include digital video recorder (DVR) functionality.

The client 104 includes a communication module 126 that is representative of functionality on the client 104 to control content playback on the client 104, such as to tune to particular channels, purchase pay-per-view content, through the use of one or more "command modes", and so on. The command modes may provide non-linear playback of the content 124(c) (i.e., time shift the playback of the content 124(c)) such as pause, rewind, fast forward, slow motion playback, and the like. Communication module 126 may also include functionality to interact with the network operator 102 to navigate and select content options, such as through an electronic programming guide (EPG) output at the client 104. An EPG may be formed via the communication module 126 at least in part through guide data received from the network operator 102 over network connection 108 and/or using guide data received from a third party service (not shown).

Using traditional techniques, processing at the network operator 102 and/or distribution from the network operator may introduce data impairments (e.g., "bad data"). Thus a traditional communication module 126 of a client 104 that is used to display the content 124(c) that is delivered from the server 118 may not display the content 124(c) as intended by the client 104. For instance, "bad data" may cause skipping or repeating of frames in television content. In some cases, "bad data" may even cause a client 104 to become stuck, e.g., communication module 126 at the client 104 may "hang up" or freeze on a frame of content 124(c) when attempting to process/output the "bad data". The "hang up" may persist until the client 104 is reset and/or reinitialized to clear the "bad data". Naturally, such "hang ups" disrupt presentation of content 124(c) via the client 104, which may be confusing and frustrating to a viewer.

In accordance with techniques described herein, presentation timing data associated with content 112(k) may be monitored at a client 104 to avoid, detect, and/or resolve "hang ups" due to data impairments such as "bad data". For example, based on the monitoring of timing data, a "hang up" may be detected and the communication module 126 and/or client 104 may be reset. The reset of a communication module 126 and/or client 104 based on monitoring of timing data may occur automatically and without viewer intervention.

As noted, timing data may be associated with content 112(k), such as by the encoder 116 of network operator 102. In particular, timing module 120 may be configured to encode/associate timing data with content 112(k) that defines timing for presentation of the content 112(k). Content 112(k) having timing data may then be communicated via the network connection 108 to a client 104. In an implementation, the timing data is configured as timestamps 128(t) which may be associated with portions of content 112(k) to indicate expected timing of the portions one to another. Therefore, content 124(c) that is received at the client 104 may include associated timestamps 128(t) as illustrated in FIG. 1.

Generally, timestamps 128(t) may be associated with successive portions of content 124(c). For example, a timestamp 128(t) may be associated with each frame of content 124(c). Alternatively, timestamps 128(t) may be associated with content 124(c) at a frame interval, such as being associated with every 10 frames, 100 frames, and so forth. A variety of other examples are also contemplated.

Timestamps 128(t) may be implemented as program clock reference (PCR) timestamps provided through use of the timestamp module 120. The timestamps 128(t) may represent a presentation clock for a content stream. In other words, the timestamps 128(t) may define proper and/or expected timing for playback of content 124(c). Timestamps 128(t) encoded in content 124(c) may be used by the communication module 126 of the client 104 to compare to a client clock 130. For instance, a comparison may be made between the client clock 130 and the presentation clock that is defined by the timestamps 128(t) to ensure that content 124(c) that is expected to be output at a given time is output at that time.

More particularly, timestamps 128(t) associated with frames or portions of content 124(c) may be compared to the client clock 130 as they are rendered for display on a display device by the communication module 126. If a problem occurs, such as a "hang up" due to "bad data", the timestamp value for the rendered frame may fall behind or otherwise begin to deviate from the client clock 130. This deviation may indicate that content 124(c) that is expected to be output by the client 104 has not been output. Accordingly, one or more corrective actions may be initiated to resolve the problem. The one or more corrective action may include, for example, resetting the client 104 and/or communication module 126, obtaining a next expected frame for output based on the client clock, clearing "bad data", and so forth. In this manner, presentation timestamps 128(t) associated with content 124(c) may be monitored to ensure that content 124(c) that is output by a client 104 matches expected timing. Further discussion of the monitoring presentation timestamps may be found in relation to the following figures.

Figure 2:
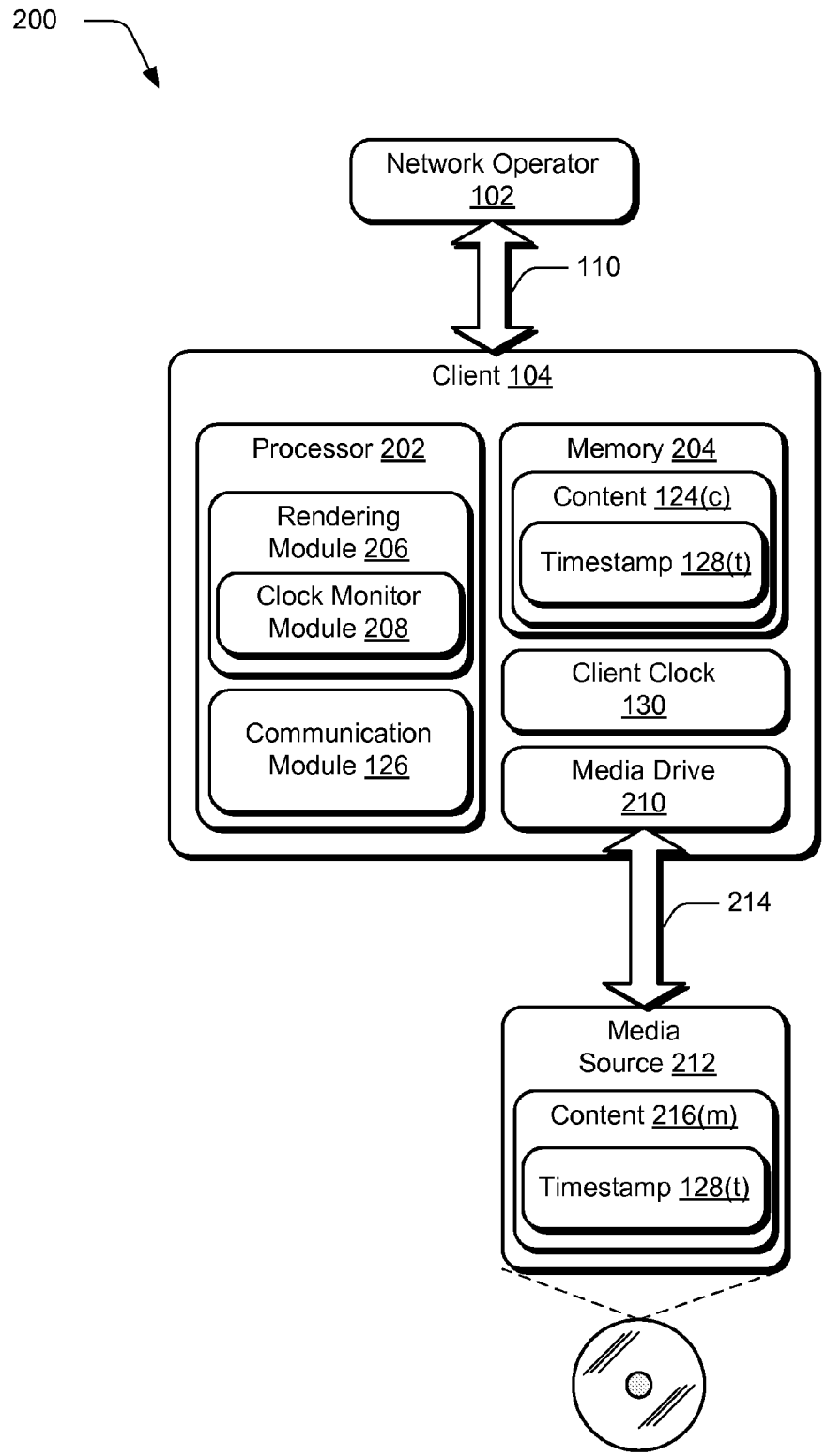
FIG. 2 is an illustration of a system employing a network operator and a client of FIG. 1 in greater detail.

FIG. 2 illustrates an exemplary implementation of a system showing a client 104 of FIG. 1 in greater detail. The client 104 is depicted as including a processor 202 and a memory 204. Processor 202 is not limited by the materials from which it is formed or the processing mechanisms employed therein, and as such, may be implemented via semiconductor(s) and/or transistors (e.g., electronic integrated circuits (ICs)), and so forth. Additionally, although a single memory 204 is shown for the client 104, a wide variety of types and combinations of memory may be employed, such as random access memory (RAM), hard disk memory, removable medium memory (e.g., the memory 204 may be implemented via a slot that accepts a removable memory cartridge), and other types of computer-readable media.

The memory 204 is illustrated as storing a variety of content 124(c) associated with timestamps 128(t). As discussed, timestamps 128(t) may be associated with content 112(k) at the encoder 116 of FIG. 1. Content 112(k) having associated timestamps 128(t) may then be communicated by the server 118 of FIG. 1 to the client 104 for streaming output or storage in the memory 204 as content 124(c).

Client 104 in the example of FIG. 2 is further depicted as executing the communication module 126 on processor 202. Communication module 126 is also storable in the memory 204. Processor 202 is further illustrated as illustrated as executing a rendering module 206 that represents functionality of client 104 to output content 124(c) on one or more display devices, for example output of video and audio content via a monitor and speakers. While illustrated as a stand-alone module in FIG. 2, the rendering module 206 may be implemented as a component of the communication module 126.

Rendering module 206 is further depicted as including a clock monitor module 208 that is representative of functionality to manage the client clock 130, such as initializing the client clock 130, synchronizing presentation of content 124(c) based on the clock, obtaining a value of the client clock 130, and so forth. Clock monitor module 208 is further representative of functionality to monitor timestamps 128(t) provided with content 124(c). For instance, clock monitor module 208 may operate to obtain timestamps 128(t) associated with content 124(c) that is rendered by the rendering module 206, and to compare the timestamps 128(t) to the client clock 130. Based on the comparison, the clock monitor module 208 may assess whether content 124(c) being rendered by the rendering module 206 is rendered as "expected". In other words, the clock monitor module 208 may check whether the timestamp 128(t) value for a given frame or portion of content matches an "expected" value that is derived from the client clock 130 when the frame or portion is rendered. If a problem or deviation is detected, clock monitor module 208 may initiate corrective actions to resolve the problem. Further discussion of the monitoring of presentation timestamps may be found in relation to the following procedures.

While aspects of monitoring presentation timestamp techniques are described with respect to content 112(k) from content providers 106 that may be processed by and communicated to a client 104 from a network operator 102, it is contemplated that a client 104 may receive content 124(c) in a variety of ways. For instance, content 124(c) may be obtained locally by the client 104, such a being stored in memory 204 and/or provided from various computer-readable media. A variety of computer-readable media is contemplated including optical disks such as compact discs (CDs) and digital video disks (DVDs), a hard disk, and so forth.

In an implementation, a client 104 may include a media drive 210 that is configured to obtain data from a corresponding media source 212. Media drive 210 may be configured to receive a media source 212 that is configured as computer-readable media insertable into the media drive 210, e.g., insertion of a flash memory card into a media drive 210 configured to receive the flash memory card. Media drive 210 may also be configured to interface via a wired or wireless connection 214 to a media source 212 that is implemented as an external storage device.

Media source 212 may be representative of various computer-readable media, storage devices, and so forth that may maintain various content 216(m) (where "m" may be any integer from one to "M"). Content 216(m) of a media source 212 includes respective timestamps 128(t) that may be encoded when the content 216(m) is produced and/or when the content 216(m) is stored on the media source 212. For example, media drive 210 may be a DVD device that is configured to read and playback optical disks (e.g., DVDs)

which store content 216(*m*). Other types and formats for a media drive 210 and a corresponding media source 212 are also contemplated. Thus, techniques to monitor presentation timestamps described herein may be employed during playback of a movie at a client 104 from a DVD or other media source 212. While media drive 210 may be an internal drive as illustrated in FIG. 2, media drive 210 may alternatively be configured as an external drive communicatively coupled to the client via a suitable media interface and/or wired or wireless connection 214.

Generally, any of the functions described herein can be implemented using software, firmware, hardware (e.g., fixed-logic circuitry), manual processing, or a combination of these implementations. The terms "module", "functionality" and "logic" as used herein generally represent software, firmware, hardware, or a combination thereof. In the case of a software implementation, for instance, the module, functionality, or logic represents program code that performs specified tasks when executed on a processor (e.g., CPU or CPUs). The program code can be stored in one or more computer-readable memory devices. The features of the techniques to monitor presentation timestamps are platform-independent, meaning that the techniques may be implemented on a variety of commercial computing platforms having a variety of processors.

Exemplary Procedures

The following discussion describes techniques that may be implemented utilizing the previously described environment, systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference will be made to the environment 100 of FIG. 1, and/or the system 200 of FIG. 2.

Figure 3:
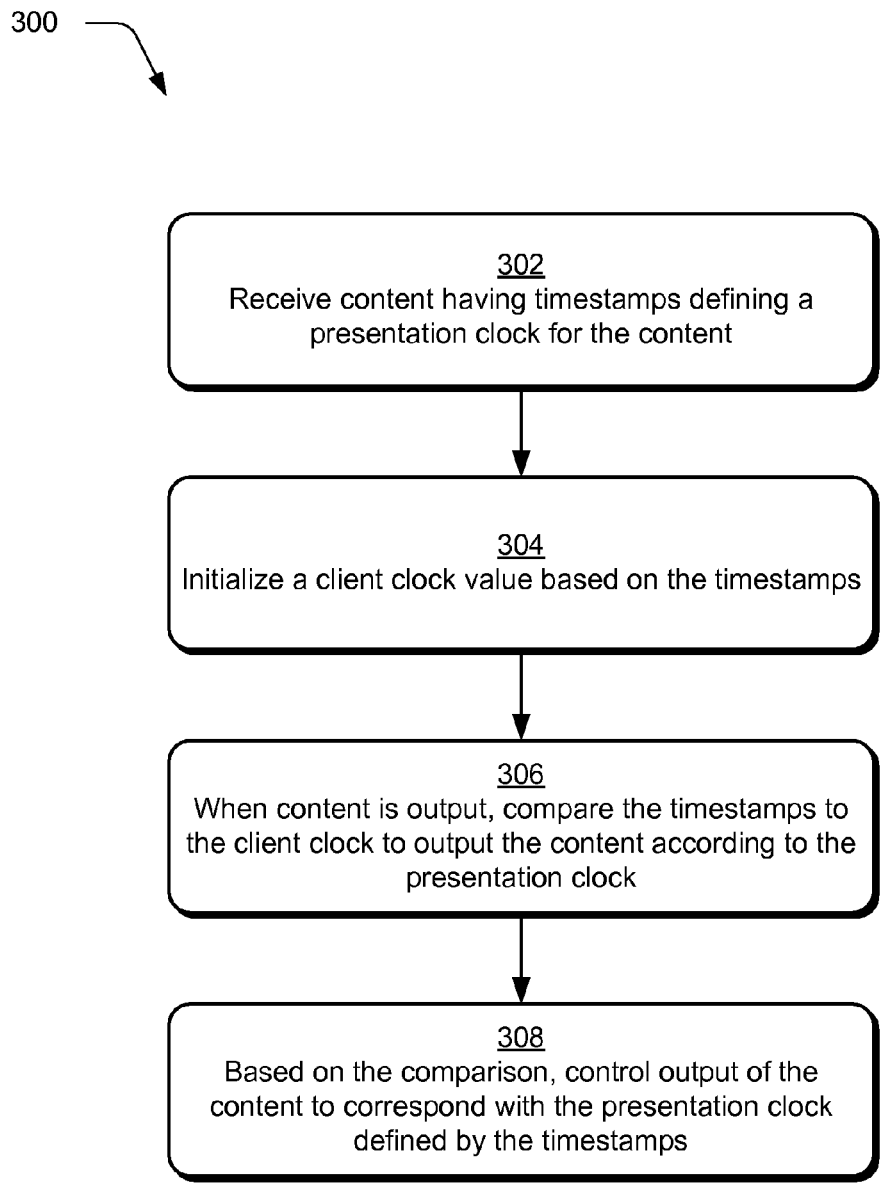
FIG. 3 is a flow diagram depicting a procedure in an exemplary implementation in which timestamps are employed to output content according to a presentation clock.

FIG. 3 depicts a procedure 300 in an exemplary implementation in which a client uses timestamps associated with content to synchronize output of the content to a presentation clock. Content is received that has timestamps that define a presentation clock for the content (block 302). For example, client 104 of FIG. 1 may receive content 112(*k*) over the network connection 108 from network operator 102. In another example, client 104 may receive content 216(*m*) from a media source 212, such as a DVD, via a media drive 210 locally at the client as discussed with respect to FIG. 2. In either case, client 104 may receive content 124(*c*) that is configured for streaming output and/or for storage in memory 204. Further, the received content 124(*c*) of a client 104 may be associated with respective timestamps 128(*t*).

The timestamps 128(*t*) may define a presentation clock for the content 124(*c*). In other words, timestamps 128(*t*) associated with respective portions of content 124(*c*) may indicate proper and/or expected timing for output of the portions relative to each other in an ordered output of the content 124(*c*). As an illustrative example, a portion having a timestamp of "2 seconds" would be expected to be output one second after a portion having a time stamp of "1 second". Thus, timestamps 128(*t*) associated with content 124(*c*) may be used to define a proper or expected presentation clock for content 124(*c*), e.g., timing for output of portions of content relative to one another.

A client clock value is initialized based on the timestamps (block 304). For example, clock monitor module 208 of FIG. 2 may be executed to manage a client clock 130. The client clock 130 may be employed to ensure that content 124(*c*) that is expected to be presented is output by the client 104. More particularly, the clock monitor module 208 may utilize the client clock 130 in various ways to manage timing of output content 124(*c*) based upon timestamps 128(*t*) with which the content 124(*c*) is associated.

In an implementation, the initialization of the client clock 130 may be inclusive of starting the client clock 130 to keep track of time. Client clock 130 may also be configured as a running clock (e.g., a continuous clock) that may be referenced to perform techniques described herein. Additionally or alternatively, the client clock 130 may be synchronized with a presentation clock that is defined by the timestamps 128(*t*). For example, the client clock 130 may be set to a value of a timestamp 128(*t*) associated with a portion of content 124(*c*), such as a portion initially rendered when a viewer tunes to a channel or begins viewing a television program, movie, or other content 124(*c*). The initialization may be further inclusive of resetting the client clock 130, establishing a difference between the presentation clock and the client clock 130, determining an initial value of the client clock 130, and so forth. When the client clock 130 is initialized, the client clock may begin running or continue to run to keep track of time.

For instance, assume a viewer navigates a communication module 126 to begin viewing content 124(*c*) that is associated with a particular programming channel. The viewer may begin viewing the content 124(*c*) at the beginning of a program, in the middle, at the end, and so forth. In each case, the viewer may view a first portion of content that may be associated with a particular timestamp 128(*t*). This particular timestamp 128(*t*) may be used by clock monitor module 208 to initialize the client clock 130. For example, the client clock 130 may be initialized to a value of the particular timestamp 128(*t*). In another example, the client clock may be set to zero initially. In either case, a difference between the client clock and the presentation clock based on the timestamps 128(*t*) associated with content 124(*c*) may be established. The difference, for example, may be zero when the client clock 130 is initialized to a value of the particular timestamp 128(*t*). The difference may be another determined value, for example, if a "running" client clock 130 is employed. Thereafter, the clock monitor module 208 may monitor the established difference to ensure that the correct content 124(*c*) is output at the expected time, and to further detect when a "hang up" may have occurred.

More particularly, when the content is output, the timestamps are compared to the client clock to output the content according to the presentation clock (block 306). For instance, clock monitor module 208 may obtain each timestamp 128(*t*) associated with content 124(*c*) and compare the timestamps 128(*t*) to the client clock 130 to check and recheck the difference or initialization value established in the preceding example. In this manner, the clock monitor module 208 may understand when the content 124(*c*) is being output in accordance with the presentation clock that is defined by the timestamps 128(*t*). Clock monitor module 208 may also understand when a deviation occurs that may prompt corrective actions to be initiated.

For instance, based on the comparison, the output of the content is controlled to correspond with the presentation clock defined by the timestamps (block 308). Continuing with the previous example, clock monitor module 208 may control the output of content 124(*c*) in a variety of ways based on comparison of the client clock 130 to the presentation clock defined by the timestamps 128(*t*). When the output of content 124(*c*) is as expected based on the comparison, rendering module 206 may continue to output the content 124(*c*). When clock monitor module 208 determines that a problem exists, it may intervene to control output of content 124(*c*) on the client 104 such that the output is as expected. For instance, clock monitor module 208 may initiate corrective actions to ensure that the output of content 124(*c*) is in accordance with the presentation clock defined by associated timestamps 128 (*t*). Again, the presentation clock is indicative of the expected timing for output of portions of content 124(*c*) relative to one another.

In an implementation, a tolerance value may be established that defines acceptable operating parameters for a difference between the client clock 130 and the presentation clock defined by timestamps 128(*t*). A tolerance value may be a configurable value that sets an amount of difference or deviation between the client clock 130 and the presentation clock that may be tolerated before action to control output of content 124(*c*) is undertaken. Thus, when the difference exceeds the established tolerance value, then clock monitor module 208 may intervene to restore timing of the output to within the acceptable parameters defined by the tolerance value.

For example, when "bad data" causes rendering module 206 to "hang up", clock monitor module 208 may continue to read a timestamp 128(*t*) associated with the "bad data" as a current value for the presentation clock. However, at the same time the client clock 130 may continue to run. Thus, a difference between the client clock 130 and the current value for the presentation clock may grow. If a "hang up" persists, then the difference may exceed a designated tolerance value. Responsive to a determination that the tolerance value has been exceeded, clock monitor module 208 may initiate various corrective actions to control the output of content 124(*c*) to correspond with the proper and/or expected presentation of the content 124(*c*). Further discussion of corrective actions to restore output of content 124(*c*) to correspond to a presentation clock may be found in relation to the following figure.

Figure 4:
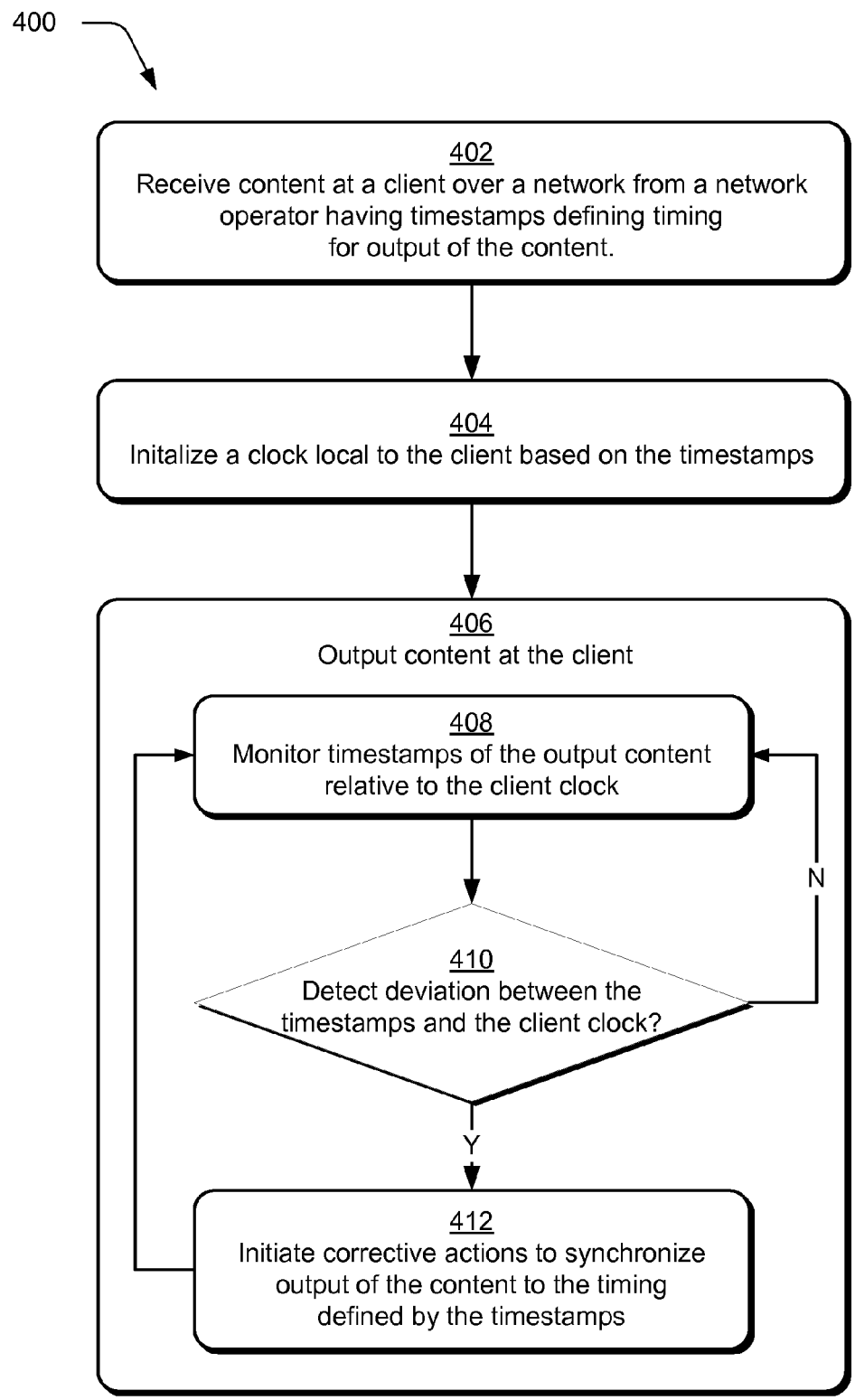
FIG. 4 is a flow diagram depicting a procedure in an exemplary implementation in which timestamps are monitored to synchronize presentation of content at a client with timing defined by the timestamps.

FIG. 4 depicts a procedure 400 in an exemplary implementation in which monitoring of timestamps is performed to synchronize output of content to timing defined by the timestamps. Content is received at a client over a network from a network operator having timestamps defining timing for output of the content (block 402). For example, an encoder 116 of FIG. 1 may be executed to associate timestamps 128(*t*) with content 112(*k*) at a network operator 102. Network operator 102 may communicate the content 112(*k*) to a client 104 over a network connection 108. Client 104 receives the content 112(*k*) as content 124(*c*) which may be output immediately and/or stored in memory 204. In an implementation, the content 124(*c*) is configured as television content. A variety of other content is also contemplated including but not limited to: music, video-on-demand, web pages, and so forth.

A clock local to the client is initialized based on the timestamps (block 404). For example, a client clock 130 may be initialized in a variety of ways to enable comparisons to timestamps 128(*t*) as discussed with respect to FIG. 3. The content is output at the client (block 406), such as through the communication module 126 and/or rendering module 206 as described with respect to FIG. 2.

While content 124(*c*) is being output, monitoring may be performed to ensure that the content 124(*c*) expected to be output is being output by the client 104. Further, the monitoring may be able to detect when a "hang up" occurs. In general, the monitoring uses the timestamps 128(*t*) to understand the expected timing of the content 124(*c*) and compares the values of timestamps 128(*t*) to the client clock 130 to check that the timing matches expectations.

More particularly, timestamps of the output content are monitored relative to the client clock (block 408). The monitoring may be performed to detect a deviation between the timestamps and the client clock (block 410). When no deviation has been detected, procedure 400 may return to block 408 where the monitoring continues, so long as the output of content 124(*c*) continues.

For the purposes of example, assume now that the client clock 130 is set to zero when output of content 124(*c*) is initiated and that a difference of zero is established between the client clock 130 and timing that is indicated by the timestamps 128(*t*) associated with the content 124(*c*). In other words, in this example, a first timestamp 128(*t*) may have a value of zero and the client clock 130 is initially set to zero. Then, the client clock 130 begins to run to keep time as the content 124(*c*) is being output. Thus, in this example, monitoring may be undertaken by clock monitor module 208 to maintain the difference of zero between the client clock 130 and timing indicated by the timestamps 128(*t*). When the difference is maintained, the output of content 124(*c*) may be said to be as expected or "synchronized" with timing defined by the timestamps 128(*t*). As noted, client clock 130 may operate to detect a deviation that exceeds an established tolerance value.

When a deviation is detected, one or more corrective actions are initiated to synchronize output of the content to the timing defined by the timestamps (block 412). Then, when proper output has been restored, procedure 400 may return to the monitoring of timestamps in block 408, so long as the output of content 124(*c*) continues.

For example, client 104 of FIG. 2 may be configured to detect when output content 124(*c*) deviates from timing defined by timestamps 128(*t*) associated with the content. The clock monitor module 208, for instance, may determine based on the monitoring of the preceding example that a deviation has occurred between the client clock 130 and expected timing for output of content 124(*c*) via the rendering module 206. In particular, a "hang up" may occur that causes the clock monitor module 208 to read a timestamp 128(*t*) associated with output content 124(*c*) that is different than the value of the client clock 130. In this case, the client clock 130 may be ahead of the timestamp 128(*t*) due to the "hang up". Accordingly, a deviation from the difference of zero established in the example may be determined when the timestamp 128(*t*) is compared to the client clock 130. If the deviation is significant, (e.g., exceeds a tolerance value) then clock monitor module 208 may respond by initiating one or more corrective actions to restore synchronization of the content 124(*c*) with timing defined by the timestamps 128(*t*).

A variety of corrective actions are contemplated. For example, corrective actions may be inclusive of resetting a client 104, resetting a rendering module 206 and/or communication module 126 configured to output content 124(*c*), clearing "bad data" from memory 204 of a client, and so forth. In an implementation, the clock monitor module 208 may skip portions of content 124(*c*) to restore synchronization of the content 124(*c*) with timing defined by the timestamps 128(*t*).

For instance, based on the client clock 130, the clock monitor module 208 may know a time value for content 124(*c*) that is expected to be output. Accordingly, clock monitor module 208 also may determine an expected value for a timestamp 128(*t*) to restore synchronization. Thus, the clock monitor module 208 may cause rendering module 206 and/or communication module 126 to obtain and output a portion of content 124(*c*) that is associated with a timestamp 128(*t*) that has the expected value to restore synchronization. In other words, clock monitor module 208 may match the client clock 130 to a timestamp 128(*t*) to determine a starting place within content 124(*c*) to restart rendering. The rendering module 206 and/or communication module 126 may be instructed to ignore the preceding data (e.g. "bad data", "hang up") and to restart rendering at a starting place corresponding to the expected value for a timestamp 128(*t*). In this manner, the clock monitor module 208 may bypass "bad data" to correct a "hang up" and restore synchronization of the content 124(*c*) to correspond timing defined by the timestamps 128(*t*).

The corrective actions initiated by client 104 to restore presentation of content 124(*c*) to timing defined by timestamps 128(*t*) may occur automatically and without viewer intervention. For instance, clock monitor module 208 may initiate corrective actions that are carried out automatically by the client 104. Additionally or alternatively, client 104 may output prompts to a viewer requesting actions on the part of the viewer. For instance, the client 104 may alert a viewer to check connections, toggle power off/on, and so forth, in addition to or in lieu of corrective actions undertaken automatically. In implementation, viewer prompts may be employed when corrective actions undertaken automatically are unsuccessful in restoring presentation of content 124(*c*) to timing defined by timestamps 128(*t*).

It is noted that timing of different portions or streams of content 124(*c*) may be managed independent of one another. For example, an audio stream may be associated with timestamps 128(*t*) that are independent of timestamps 128(*t*) associated with a video stream, e.g., derived from a common time-base using timestamp module 120. In this case, the client clock 130 may be shared as the time source for both an audio renderer and a video renderer that may be represented by the rendering module 206. The clock monitor module 208 may compare the client clock 130 to ensure that the timing matches expected timestamps 128(*t*) for both an audio stream being rendered by the audio renderer and a video stream being rendered by the video renderer. In an implementation, the clock monitor module 208 makes a simultaneously comparison to ensure synchronization of the audio stream and the video stream. When the clock monitor module 208 detects a deviation in the timing of rendering of the audio stream and/or video stream relative to the expected timestamps 128(*t*), corrective action is taken to control output of content 124(*c*).

One of the features of clock monitor module 208 may be to facilitate synchronization of the output of various streams associated with content 124(*c*). To do so, a client 104 may maintain different client clocks 130 for different respective streams. Additionally or alternatively, clock monitor module 208 may establish and monitor differences between a single client clock 130 and timing that is defined for multiple streams, such as timing defined at a network operator 102 using different sets of timestamps 128(*t*) for different streams. Thus, clock monitor module 208 may detect and manage an audio stream "hang up" separately from output of video stream, and vice versa. In this manner, client 104 and in particular clock monitor module 208 may manage different streams associated with content 124(*c*) individually. A variety of other examples are also contemplated without departing from the spirit and scope thereof.

CONCLUSION

Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

What is claimed is:

1. A method comprising:
   receiving, at a client, content packetized and distributed by a network operator over an IP network and having timestamps encoded by the network operator in the content that define timing for output of the content including different sets of timestamps associated with multiple different streams that make-up the content;
   setting a client clock based on the timestamps;
   when the content is output, comparing the timestamps to the client clock; and
   controlling output of the content at the client to correspond with the timing defined by the timestamps based on the comparing using the different sets of timestamps to separately control the multiple different streams including resolving a hang up due to a data impairment when a tolerance value for deviation from the client clock is exceeded by skipping some portions of the content to restore output of the content to expected timing defined by the timestamps.

2. A method as described in claim 1, wherein the setting of the client clock comprises setting the client clock to zero and starting the clock to keep time when the content is output.

3. A method as described in claim 1, wherein the timestamps define a presentation clock indicating expected times for output of portions of the content relative to one another.

4. A method as described in claim 3, wherein the setting of the client clock comprises synchronizing the client clock with the presentation clock defined by the timestamps.

5. A method as described in claim 1, wherein the content includes video content and the timestamps are associated with the video content at a frame interval that corresponds to a number of video frames between the timestamps.

6. A method as described in claim 1, wherein the content is television content received over a network from a network operator.

7. A method as described in claim 6, wherein the network operator is configured to associate the timestamps with the content to define the timing for output of the content.

8. A method as described in claim 7, wherein:
   the content includes at least an audio stream and a video stream;
   the network operator associates a set of timestamps derived from a common time-base with both the audio stream and the video stream; and
   the comparing includes:
      comparing the timestamps associated with the audio stream to the client clock; and
      simultaneously comparing the timestamps associated with the video stream to the client clock.

9. A method as described in claim 1, wherein the content is recorded video content that is received locally from computer-readable media via a media drive associated with the client.

10. A method as described in claim 1, wherein the controlling of the output of the content includes:
    determining an expected timestamp value based on the client clock;
    obtaining a portion of the content associated with a said timestamp that matches the expected timestamp value; and
    outputting the obtained portion of the content to restore output of the content to correspond to the timing defined by the timestamps.

11. A method as described in claim 1, wherein the controlling is performed when the comparing determines that a tolerance value defining an acceptable amount of deviation between the client clock and the timing defined by the timestamps is exceeded.

12. A method as described in claim 1, wherein controlling output of the content to correspond with the timing defined by the timestamps includes performing one or more corrective actions selected from a group consisting of:
resetting the client;
resetting a renderer of the client that is configured to output the content;
skipping a portion of the content;
obtaining and outputting a portion of the content having a timestamp that matches an expected timestamp value to restore output of the content to correspond with the timing defined by the timestamps; and
outputting a prompt to a viewer to perform one or more corrective actions.

13. A method as described in claim 1, further comprising:
determining a difference between the client clock and the timing defined by the timestamps; and
establishing a tolerance value that defines an acceptable amount of deviation for the determined difference;
wherein, for each portion of the content associated with one of said timestamps, the comparing includes determining when a difference between said timestamp associated with the portion and the client clock when the portion is output exceeds the tolerance value.

14. One or more computer-readable storage media excluding a signal per se storing computer-executable instructions that, when executed by a client, direct the client to perform acts including:
receiving, at the client, packetized content obtained over an IP network having timestamps encoded in the content that define timing for output of the content independently for an audio stream and a video stream of the content;
setting a client clock based on the timestamps;
when the content is output, separately comparing the timestamps for the audio stream and the video stream to the client clock; and
controlling output of the content at the client to correspond with the timing defined by the timestamps based on the comparing including resolving a data impairment when a tolerance value for deviation from the client clock is exceeded by instructing a rendering module to ignore content associated with the data impairment and restarting rendering at a starting place corresponding to expected timing defined by the time stamps.

15. One or more computer-readable storage media as described in claim 14, wherein the timestamps define a presentation clock indicating expected times for output of portions of the content relative to one another.

16. One or more computer-readable storage media as described in claim 14, wherein the setting of the client clock comprises synchronizing the client clock with the presentation clock defined by the timestamps.

17. One or more computer-readable storage media method as described in claim 14, wherein the content includes video content and the timestamps are associated with the video content at a frame interval that corresponds to a number of video frames between the timestamps.

18. A client device comprising:
one or more processors; and
one or more computer-readable storage media storing computer-executable instructions executable via the one or more processors to perform acts including:
receiving, at the client device, packetized content received from a network over an IP network and having timestamps encoded in the content that define expected timing for output of multiple streams of the content individually;
setting multiple client clocks based on the timestamps for each of the multiple streams;
when the content is output, comparing respective timestamps to the multiple client clocks to independently manage the multiple streams; and
controlling output of the multiple streams of content at the client device to correspond with the timing defined by respective timestamps based on the comparing, including resolving a hang up due to a data impairment when a tolerance value is exceeded and instructing a renderer of the client device to skip at least some portions of the content to restore output of the content to expected timing defined by the timestamps when a data impairment is detected.

19. A client device as described in claim 18, wherein:
the content is television content received over a network from a network operator;
the content includes at least an audio stream and a video stream;
the network operator associates a set of timestamps derived from a common time-base with both the audio stream and the video stream; and
the comparing includes:
comparing the timestamps associated with the audio stream to the client clock; and
simultaneously comparing the timestamps associated with the video stream to the client clock.

20. A client device as described in claim 18, wherein the controlling of the output of the content includes:
determining an expected timestamp value based on the client clock;
obtaining a portion of the content associated with a said timestamp that matches the expected timestamp value; and
outputting the obtained portion of the content to restore output of the content to correspond to the timing defined by the timestamps.

* * * * *